（12）United States Patent
Kitanishi et al.

(10) Patent No.: US 12,378,084 B2
(45) Date of Patent: Aug. 5, 2025

(54) TIRE TRANSPORT APPARATUS (71) Applicant: Murata Machinery, Ltd., Kyoto (JP)

(72) Inventors: Hiroya Kitanishi, Tokyo (JP);
Hidenori Yamagishi, Tokyo (JP);
Tomohiro Aoi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 255 days.

(21) Appl. No.: 18/273,050

(22) PCT Filed: Nov. 11, 2021

(86) PCT No.: PCT/JP2021/041586
§ 371 (c)(1),
(2) Date: Jul. 19, 2023

(87) PCT Pub. No.: WO2022/158092
PCT Pub. Date: Jul. 28, 2022

(65) Prior Publication Data
US 2024/0083695 A1 Mar. 14, 2024

(30) Foreign Application Priority Data
Jan. 21, 2021 (JP) ................. 2021-008143

(51) Int. Cl.
B29D 30/00 (2006.01)
B65G 47/90 (2006.01)
(52) U.S. Cl.
CPC ............. B65G 47/90 (2013.01); B29D 30/00 (2013.01); B65G 2201/0273 (2013.01)
(58) Field of Classification Search
CPC .......... B29D 30/0016; B29D 2030/0022–0044
See application file for complete search history.

(56) References Cited

U.S. PATENT DOCUMENTS 4,618,303 A * 10/1986 Irie ................... B29D 30/0016
425/38
11,633,929 B2 * 4/2023 Bijl ...................... B25J 15/0052
414/801
(Continued)

FOREIGN PATENT DOCUMENTS

JP 05177637 A * 7/1993 ......... B29D 30/0016
JP 06126678 A * 5/1994
(Continued)

OTHER PUBLICATIONS

International Search Report dated Feb. 8, 2022 in counterpart International Application No. PCT/JP2021/041586 w/English translation.
(Continued)

Primary Examiner — Gerald McClain
(74) Attorney, Agent, or Firm — DLA Piper LLP (US)

(57) ABSTRACT

A tire transport apparatus includes at least three arms each having an arm main body and a protrusion disposed to protrude outward at a lower part of the arm main body to lift the tire, an arm extension/retraction mechanism configured to move the at least three arms in a horizontal extension/retraction direction, a lift mechanism configured to raise and lower the at least three arms, at least three optical reflection sensors disposed on an outer side of a circle including distal ends of the protrusions when the at least three arms are above the tire and in a retracted state to detect an object below, and a controller configured to determine that one or more arms among the at least three arms are in an inappropriate position, if one or more optical reflection sensors among the at least three optical reflection sensors detect the tire.

7 Claims, 12 Drawing Sheets (56) References Cited

U.S. PATENT DOCUMENTS

| | | | |
|---|---|---|---|
| 2016/0355335 A1* | 12/2016 | Whitfield, Jr. | B65F 3/041 |
| 2017/0028553 A1* | 2/2017 | Tsuda | G06N 3/088 |
| 2019/0337248 A1* | 11/2019 | Sakata | B29D 30/0016 |
| 2020/0247609 A1* | 8/2020 | Maroney | B65F 3/04 |
| 2020/0270102 A1* | 8/2020 | Wada | H01L 21/67259 |
| 2020/0339345 A1* | 10/2020 | Lewis | B65F 3/041 |
| 2020/0339346 A1* | 10/2020 | Maroney | B25J 5/06 |
| 2022/0002086 A1 | 1/2022 | Ukai | |
| 2023/0109072 A1* | 4/2023 | Suzuki | B65G 61/00 414/788.1 |

FOREIGN PATENT DOCUMENTS

| | | | | |
|---|---|---|---|---|
| JP | 2003020190 A | * | 1/2003 | |
| JP | 2004238147 A | * | 8/2004 | |
| JP | 2005035770 A | * | 2/2005 | B66C 1/28 |
| JP | 2008162733 A | * | 7/2008 | |
| WO | 2020/105268 A1 | | 5/2020 | |
| WO | 2020/242294 A1 | | 12/2020 | |

OTHER PUBLICATIONS

Written Opinion dated Feb. 8, 2022 in counterpart International Application No. PCT/JP2021/041586.

* cited by examiner

FIG. 14

TIRE TRANSPORT APPARATUS

TECHNICAL FIELD

This disclosure relates to a tire transport apparatus, in particular an apparatus that inserts a plurality of arms inside an upper opening edge of a center hole of a tire in a lying position from above to lift the tire by supporting the upper opening edge with hooks of the arms from below.

BACKGROUND

The tire transport apparatus includes the plurality of arms each having the hook formed at the distal end, an arm extension/retraction mechanism to move the arms in a horizontal extension/retraction direction, and a lift mechanism to raise and lower the arms and the arm extension/retraction mechanism.

The tire transport apparatus lowers the plurality of arms from above of an upper opening of the center hole of the tire in a lying position to insert the same into the upper opening, and then moves the arms in an extension direction so that the hooks move to below the upper opening edge. Lastly, the tire transport apparatus moves the arms upward so that the hooks support the upper opening edge of the tire from below, and lifts the tire.

For instance, there is known an article transfer apparatus that inserts four arms into the bore of the tire to transfer the tire (see JP-A-2008-162733, for example).

In general, tires are stacked and stored. Further, the stacked tires may be deformed and tilted as time elapses. It is because the tires are soft and sticky.

On the other hand, the tire transport apparatus performs stop control in predetermined coordinates. Therefore, if the stacked tires are tilted as described above, the hook may hit the tilted tire when the arm is lowered. Thus, the tire cannot be transported and might be damaged as well.

It could therefore be helpful to control the arm so that it can hardly damage the tire when the tire transport apparatus holds the tire.

SUMMARY

A tire transport apparatus is an apparatus for lifting and transporting a tire, includes at least three arms, an arm extension/retraction mechanism, a lift mechanism, at least three optical reflection sensors, and a controller.

The at least three arms each have an arm main body and a protrusion disposed to protrude outward at a lower part of the arm main body for lifting the tire.

The arm extension/retraction mechanism moves the arms in a horizontal extension/retraction direction.

The lift mechanism raises and lowers the arms.

The at least three optical reflection sensors are disposed on the outer side of a circle including distal ends of the protrusions when the arms are above the tire and in a retracted state to detect an object below. The optical reflection sensor is a sensor that can detect reflected light when emitting light downward. In addition, "downward" means an area just below the optical reflection sensor or an area just below the same and vicinity thereof. As described later, the optical reflection sensor may be a distance sensor that detects a distance to an object below. The optical reflection sensor may be not a distance sensor but a sensor that simply detect an object below.

If at least one of the optical reflection sensors detects the tire, the controller determines that the arms are in an inappropriate position.

In this apparatus, as a basic transport operation, the lift mechanism lowers the arms to locate the same inside the tire, and then the arm extension/retraction mechanism extends the arm main bodies of the three arms outward in the horizontal direction, and lastly the lift mechanism raises the arms to lift the tire using the protrusions of the arms.

In this apparatus, if the optical reflection sensor detects the tire, it means that the tire is located at a position overlapping the protrusion in a plan view. For example, the lift mechanism need not lower the arms. Therefore, the protrusion does not contact the tire if the tire is tilted or in an inappropriate position.

If none of the optical reflection sensors detects the tire, the controller determines that the arms are in an appropriate position. Then, the controller performs the operation to lift the tire. Specifically, the controller lowers the arms, extends the arm main bodies outward in the horizontal direction, and raises the arms to lift the tire using the protrusions of the arms.

If at least one of the optical reflection sensors detects the tire, the controller may move the at least three arms in the direction from the laser distance sensor that has detected the tire toward the center of the circle. By moving the arms, the position of the arms is corrected.

The optical reflection sensor may be a laser distance sensor.

The controller may monitor the distances measured by the laser distance sensors, and if there is a difference between the distances measured by the laser distance sensors, the controller may determine that the tire is detected by the optical reflection sensor. The distance measured by the laser distance sensor means a distance between the laser distance sensor and an object (the tire or a floor or the like) just below the laser distance sensor.

In this apparatus, using the laser distance sensors, it is possible to accurately detect presence or absence of the tire. Specifically, there is the tire just below the sensor that detected a short distance.

When the optical reflection sensor does not detect the tire includes when the laser distance sensor detects a distance, which is a distance to an object other than the tire. In addition, when the optical reflection sensor detects the tire includes when the laser distance sensor detects a distance, which is a distance to the tire.

The controller may move the arms in the direction from the laser distance sensor that has detected the short distance toward the center of the circle, and then may monitor the distances measured by the laser distance sensors.

In this apparatus, by moving the arms in the direction where the laser distance sensor just above the tire separates from the tire, the position of the arms is corrected. As a result, the protrusion hardly contacts the tire, and thus transportation of the tire can be continued.

The controller may determine the number of tires that can be transported on the basis of a difference between the distances measured by the laser distance sensors.

In this apparatus, also when there is a difference between the distances measured by the laser distance sensors, only the transportable number of tires can be transported. Therefore, transport efficiency of the tires can be improved.

The tire transport apparatus may further include a contact sensor disposed at a bottom surface of the protrusion to detect contact between a distal end side of the protrusion and an object below.

If the contact sensor detects the tire during lowering of the arm, the controller may control the lift mechanism to stop further lowering of the arm.

In this apparatus, if the contact sensor at the lower end of the arm contacts the tire, lowering of the arm is stopped. In this way, damage to the tire is prevented. The detection of the tire by the contact sensor in this way means that the tire exists in a position in which it interferes with the protrusion though the optical reflection sensor was not able to detect it.

Thus, when the tire transport apparatus holds a tire, the arms of the tire transport apparatus hardly damage the tire.

REFERENCE SIGNS LIST 1 tire transport apparatus
3 first rail
5 second rail
7 mobile unit
9 gripper device
21 base
23 arm
25 hook
31A first laser distance sensor
31B second laser distance sensor
31C third laser distance sensor
33A first contact sensor
33B second contact sensor
33C third contact sensor
51 controller
71 X-axis drive device
73 Y-axis drive device
75 Z-axis drive device
77 arm extension/retraction device

DETAILED DESCRIPTION

1. First Example (1) Basic Structure of Tire Transport Apparatus

Figure 1:
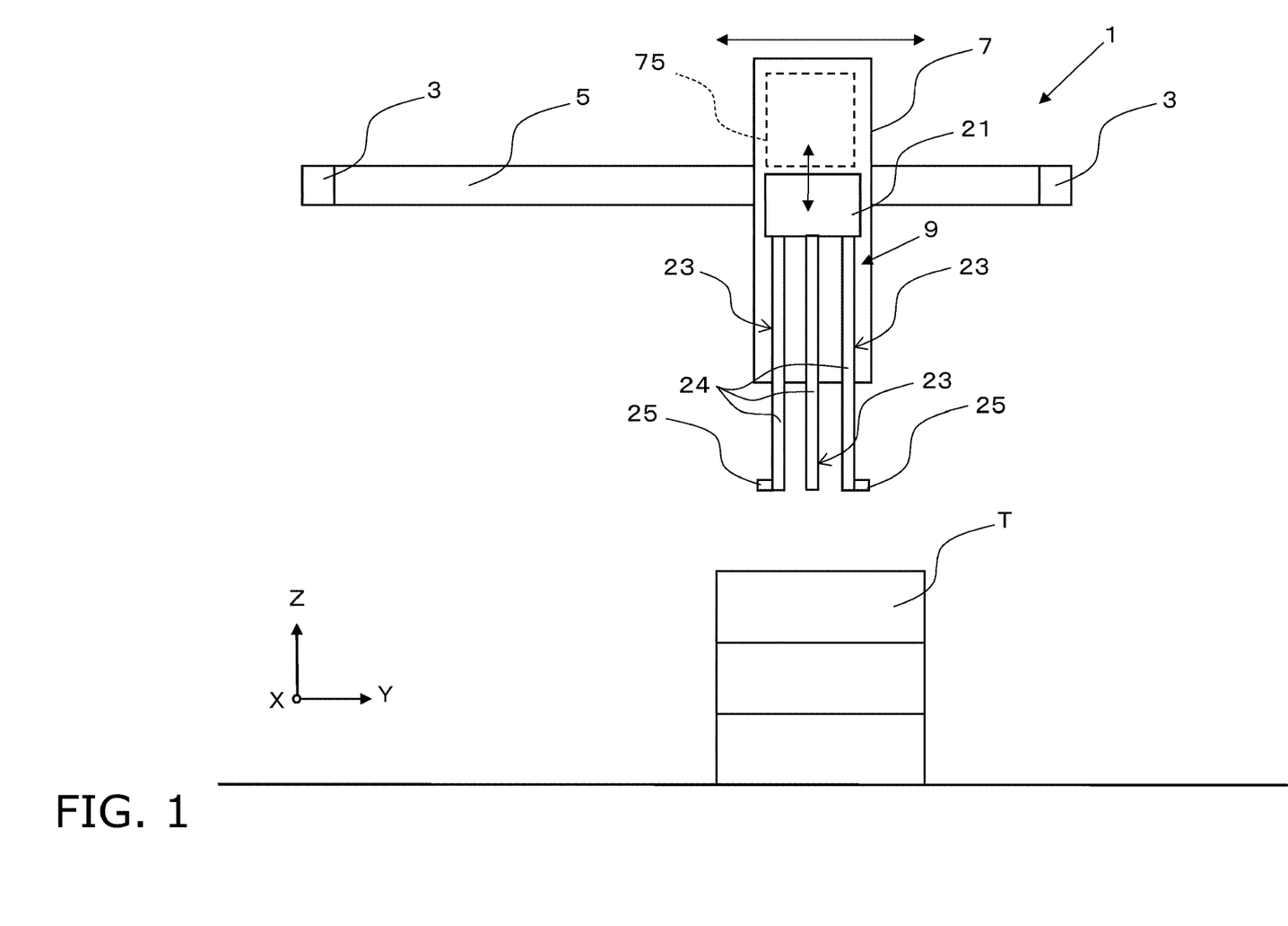
FIG. 1 is a schematic front view of a tire transport apparatus.

FIG. 1 is a schematic front view of the tire transport apparatus. With reference to FIG. 1, a tire transport apparatus 1 is described.

The tire transport apparatus 1 is an apparatus or a facility that transports a tire T in a horizontally held and lifted state (in a state where the meridian cross section of the tire becomes substantially horizontal). Specifically, it moves, stacks, or destocks the tires T. In FIG. 1, the direction perpendicular to the paper is a first direction (arrow X), and the left and right direction is a second direction (arrow Y). The vertical direction is shown by an arrow Z.

Figure 2:
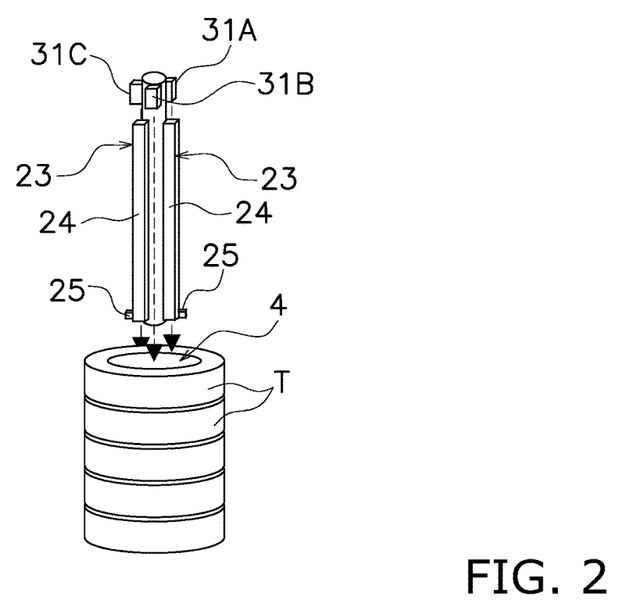
FIG. 2 is a schematic perspective view illustrating a positional relationship among arms of the tire transport apparatus, laser distance sensors thereof, and tires.

The tire T is a rubber hollow member having a center hole 4 (see FIG. 2).

The tire transport apparatus 1, which has a structure called a gantry crane, includes a pair of first rails 3, a second rail 5, and a mobile unit 7.

The pair of first rails 3 are disposed at positions above the ground to extend in the first direction in parallel with each other, and are separate from each other in the second direction.

The second rail 5 extends in the second direction between the pair of first rails 3, and is driven by an X-axis drive device 71 (see FIG. 9) so that it can move along the pair of first rails 3 in the first direction.

The mobile unit 7 is supported by the second rail 5 and is driven by a Y-axis drive device 73 (see FIG. 9) so that it can move along the second rail 5 in the second direction.

The tire transport apparatus 1 includes a gripper device 9. The gripper device 9 is mounted to the mobile unit 7 in a vertically movable manner, and is a device that grips and transports the tire T. Specifically, the gripper device 9 grips the tire T from inside to lift it up, and then moves it horizontally to transfer it.

The tire transport apparatus 1 includes a Z-axis drive device 75. The Z-axis drive device 75 is a mechanism for raising and lowering the gripper device 9 mounted to a lower part thereof. The Z-axis drive device 75, which is a known technique, includes a belt (not shown) that hangs and supports the gripper device 9, a hoisting device that winds and rewinds the belt to raise and lower the gripper device 9, and the like, for example.

(2) Detailed Structure of Gripper Device

The gripper device 9 includes a base 21 fixed to the Z-axis drive device 75, and three arms 23 extending downward from the base 21 in the vertical direction.

The base 21 is a lift platform and is hanged in the vertical direction from the mobile unit 7 by the belt (not shown) of the Z-axis drive device 75.

The three arms 23 are arranged at regular intervals in the circumferential direction of a predetermined circle with angles of 120 degrees between them.

A lower end of an arm main body 24 of each arm 23 is provided with a hook 25 that protrudes and extends outward in the horizontal direction. The hook 25 engages with an upper bead part of the tire T from below. In the state where the three hooks 25 of the three arms 23 are engaged with the upper bead part of one tire T from below, the three arms 23 are raised, and the tire can be lifted up.

A touch sensor (not shown) may be mounted to an outer side surface of the arm 23. This touch sensor is used to detect that a main body of the arm 23 contacts an upper opening edge of the center hole 4 of the tire T when the arm 23 is moved outward.

Figure 9:
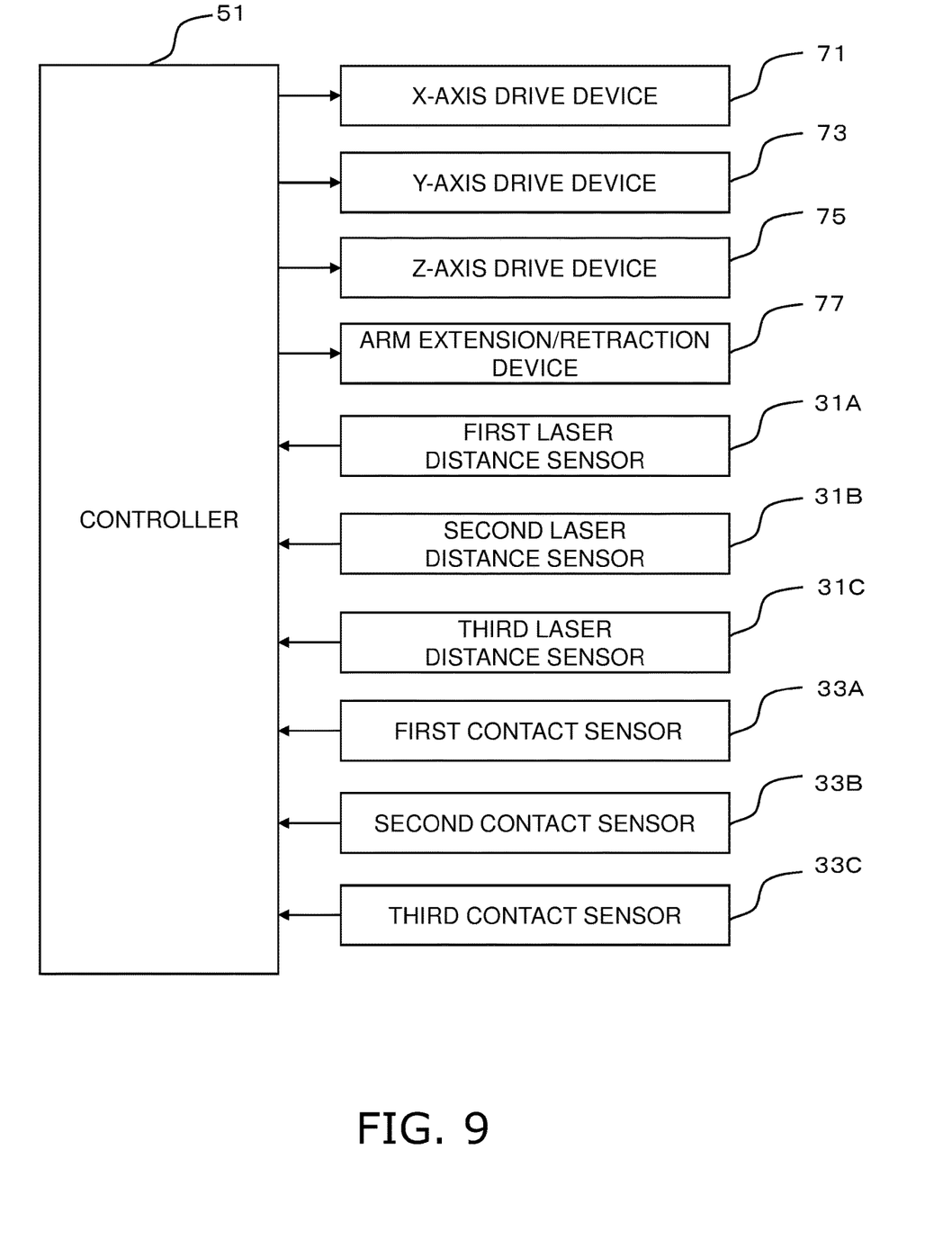
FIG. 9 is a block diagram illustrating a control structure of the tire transport apparatus.

The gripper device 9 includes an arm extension/retraction device 77 (see FIG. 9). The arm extension/retraction device 77 is a chuck device that extends/retracts the three arms 23 in the horizontal radial direction (i.e., it switches them between an extended state and a retracted state). The arm extension/retraction device 77 is mounted to the base 21.

The arm extension/retraction device 77, which is a known technique, includes a chuck cylinder (not shown), and an interlocking mechanism (not shown) for moving the arms 23 in an interlocking manner, for example.

The arms 23 are separated from each other most in the circumferential direction in the extended state, while they are close to each other most in the circumferential direction in the retracted state.

The gripper device 9 includes a first laser distance sensor 31A, a second laser distance sensor 31B, and a third laser distance sensor 31C. The first to third laser distance sensors 31A to 31C are used to detect distances in the height direction between the base 21 of the gripper device 9 and an object below. The first to third laser distance sensors 31A to 31C are mounted to a lower part of the base 21, and are configured to emit laser beams right downward, i.e., downward in the vertical direction.

Figure 3:
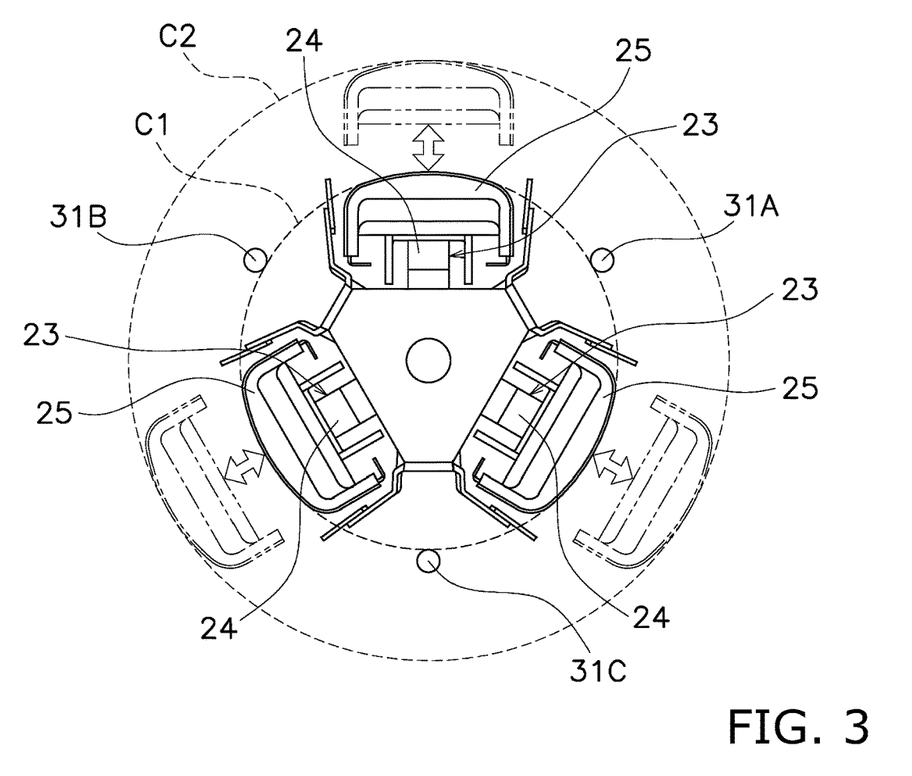
FIG. 3 is a plan view illustrating a positional relationship among hooks and the laser distance sensors.

The first to third laser distance sensors 31A to 31C are each arranged between the hooks 25 in the circumferential direction as illustrated in FIGS. 2 and 3, and specifically with angles of 120 degrees between them on a predetermined circle. More specifically, the first to third laser distance sensors 31A to 31C are disposed on the outer side of a first circle C1 including the distal ends of the hooks 25 when the arms 23 are retracted most (as an example of the retracted state).

In this example, the first to third laser distance sensors 31A to 31C are disposed adjacent to the first circle C1. However, it is sufficient that the first to third laser distance sensors 31A to 31C are disposed between the first circle C1 and a second circle C2 including the distal ends of the hooks 25 when the arms 23 are extended most (as an example of the extended state). In other words, the first to third laser distance sensors 31A to 31C are disposed in an area outside the first circle C1 and inside the second circle C2. The first to third laser distance sensors 31A to 31C may be disposed apart from the first circle C1 outward in the radial direction. In addition, the first to third laser distance sensors 31A to 31C may not be aligned in the circumferential direction. In other words, the first to third laser distance sensors 31A to 31C may be disposed to have different distances from the center.

As described above, the first to third laser distance sensors 31A to 31C are disposed on the outer side of the first circle C1 including the distal ends of the hooks 25 when the arms 23 are above the tire T and in the retracted state to detect an object below.

The gripper device 9 is equipped with first to third contact sensors 33A to 33C (see FIG. 9), each of which is mounted to the bottom surface of the hook 25, and moves vertically at a side of the distal end of the hook 25. The first to third contact sensors 33A to 33C are each a sensor that detects that the bottom surface of the hook 25 abuts the top surface of the tire T during lowering of the arms 23.

Figure 4:
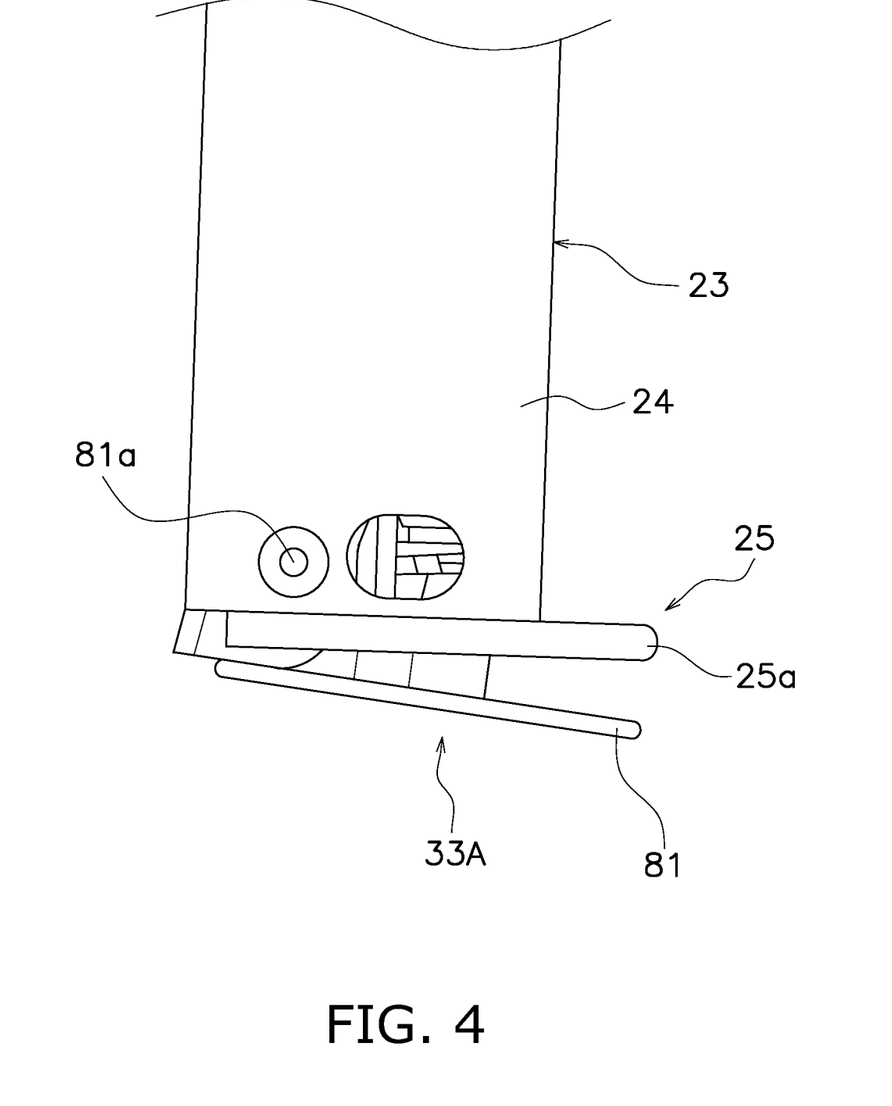
FIG. 4 is a partial side view illustrating a lower part of the arm, the hook, and a contact sensor.

With reference to FIG. 4, the first contact sensor 33A is described as an example of the contact sensor. FIG. 4 is a partial side view illustrating a lower part of the arm, the hook, and the contact sensor.

The first contact sensor 33A has a plate 81 that rocks vertically. A distal end side of the plate 81 is pivoted by a pivot shaft 81a extending in the horizontal direction at the lower part of the arm 23. The plate 81 can move between a horizontal position in which it abuts a main body 25a of the hook 25 and an inclined position at which the distal end is separated downward.

The first contact sensor 33A has a spring (not shown, such as a coil spring) that elastically biases the plate 81 downward in the rocking direction. Therefore, the plate 81 is normally in the inclined position.

The first contact sensor 33A has a load cell (not shown). The load cell is positioned so that it is compressed between the plate 81 and another member of the hook 25 when the plate 81 contacts an object below and rocks upward to the horizontal position.

(3) Basic Action of Lifting Tire

With reference to FIGS. 5 to 8, there is described a basic operation of the tire transport apparatus 1 when it lifts the tire T in a lying position. FIGS. 5 to 8 are schematic diagrams each illustrating one state of the tire lifting operation.

Figure 5:
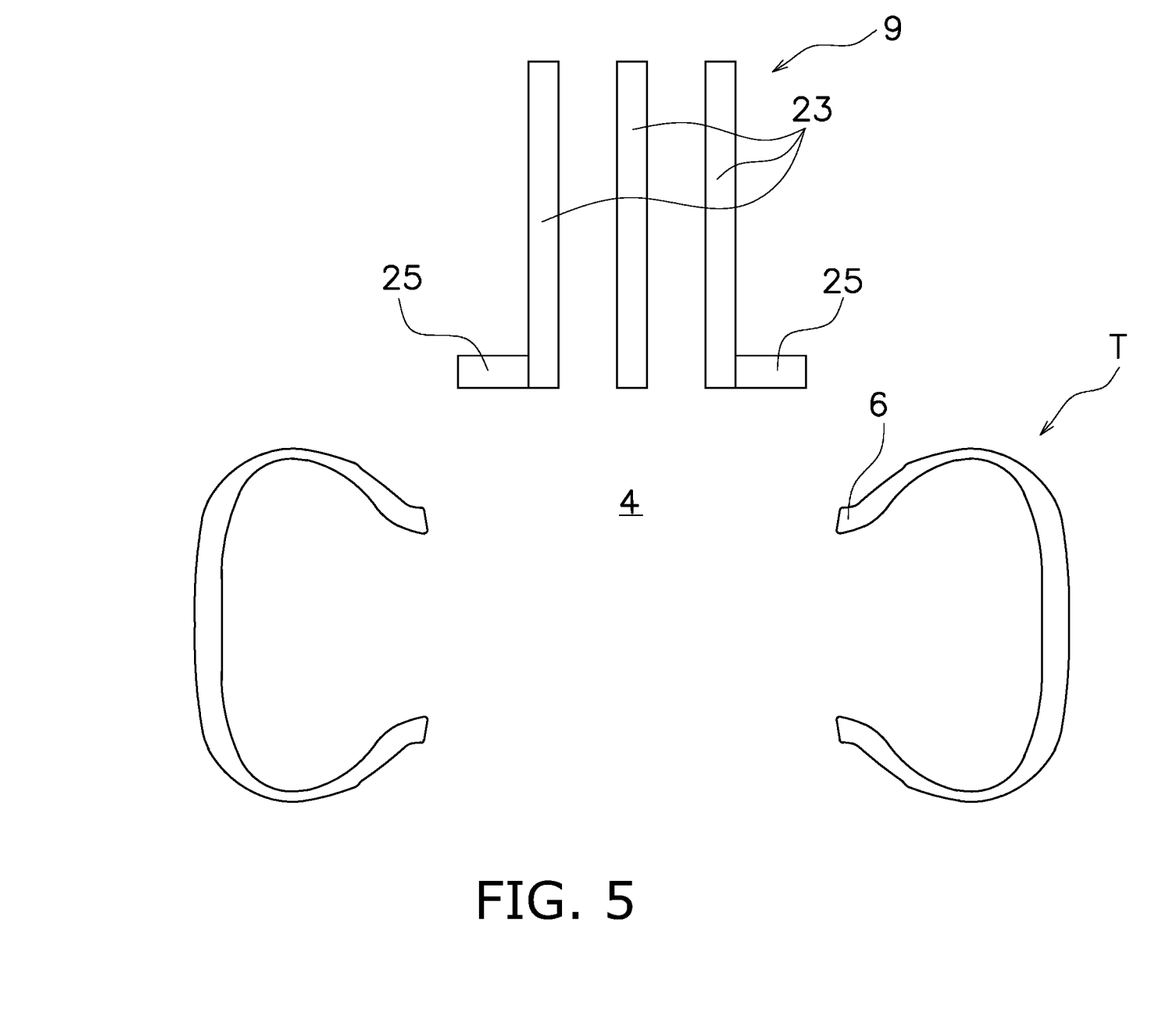
FIG. 5 is a schematic diagram illustrating one state of a tire lifting operation.

First, as illustrated in FIG. 5, the gripper device 9 is located just above the tire T (i.e., just above the center hole).

Figure 6:
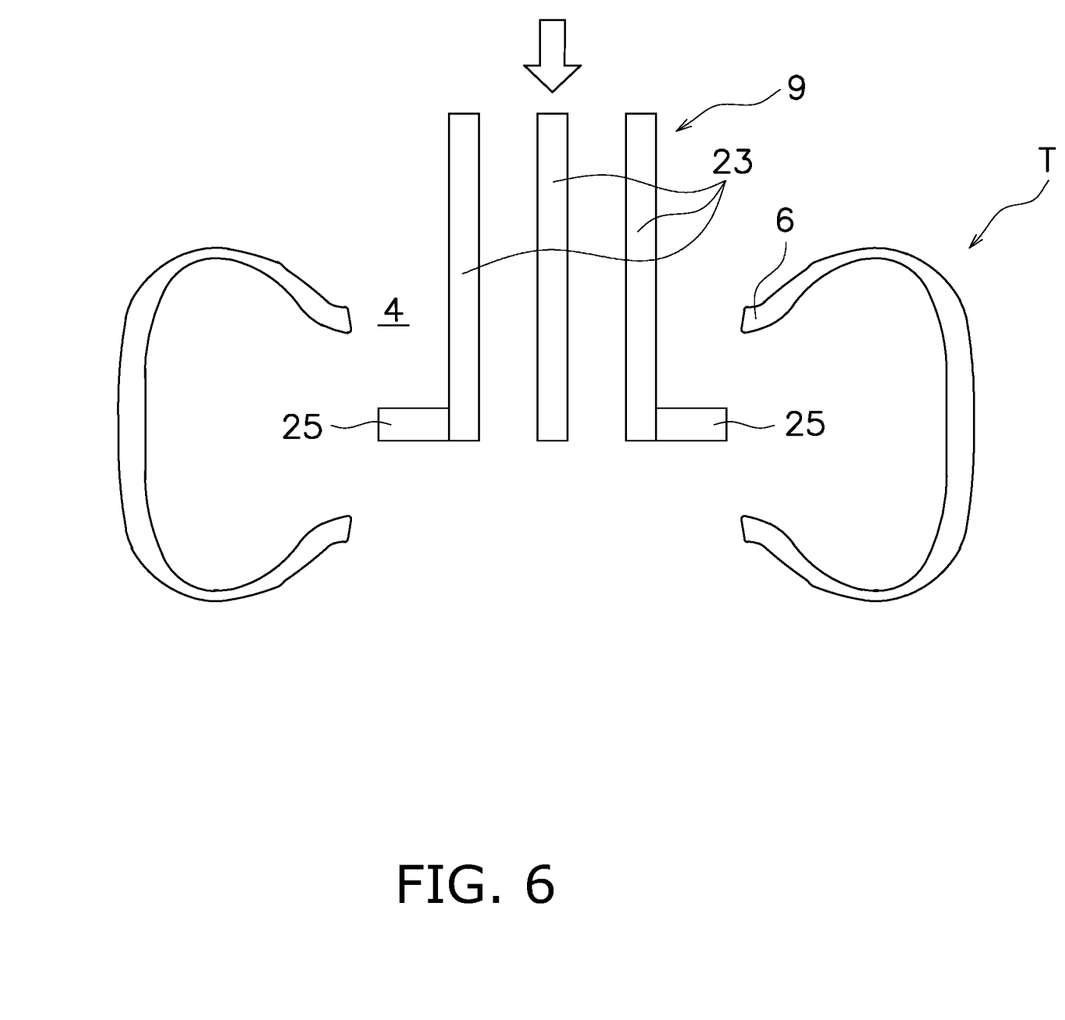
FIG. 6 is a schematic diagram illustrating one state of the tire lifting operation.

Next, as illustrated in FIG. 6, the three arms 23 in the retracted state are lowered to enter inside an upper opening edge 6 so that the distal ends of the hooks 25 are positioned in the center or its vicinity of the tire T in the vertical direction.

Figure 7:
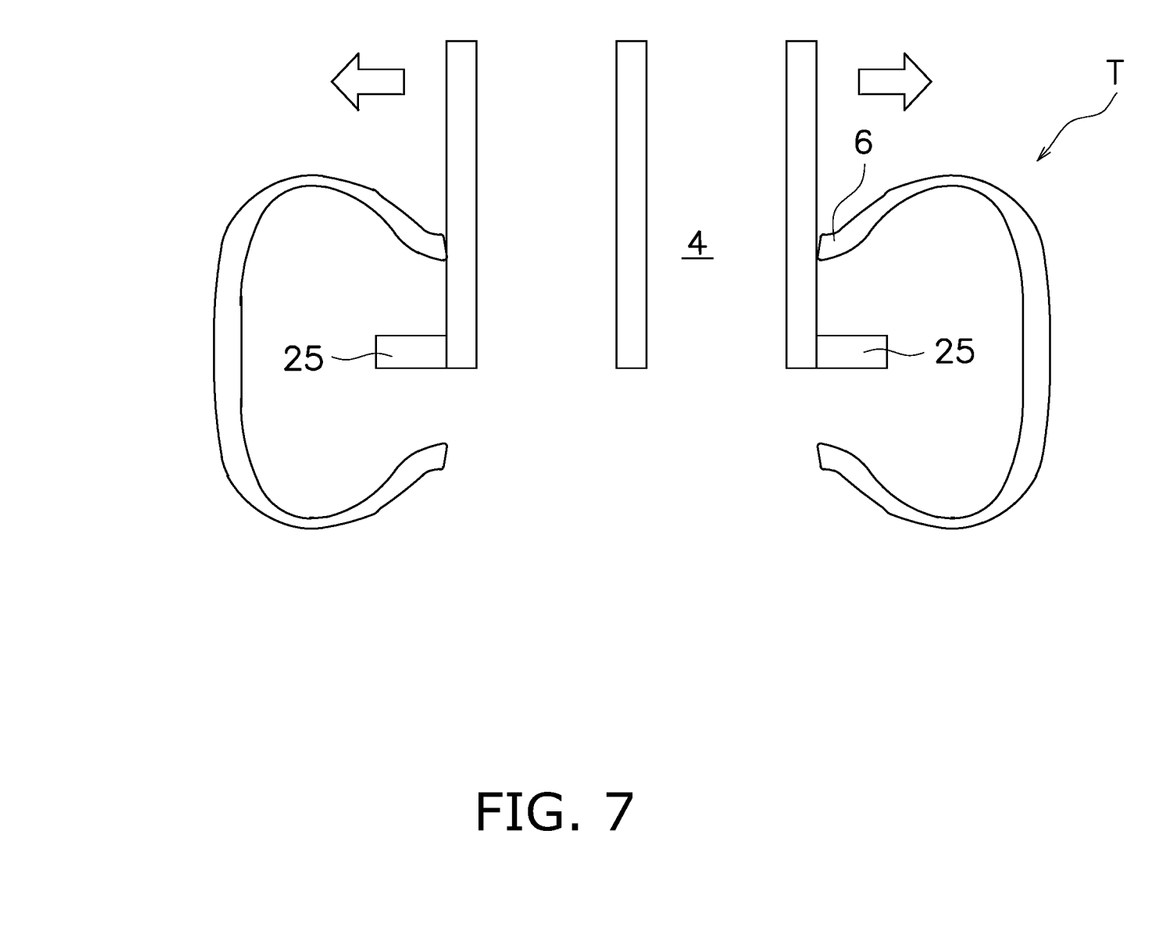
FIG. 7 is a schematic diagram illustrating one state of the tire lifting operation.

Next, as illustrated in FIG. 7, the three arms 23 are extended in the radial direction of the tire, and the hooks 25 are moved to positions to engage the upper opening edge 6 (bead part) of the tire T in a plan view.

Figure 8:
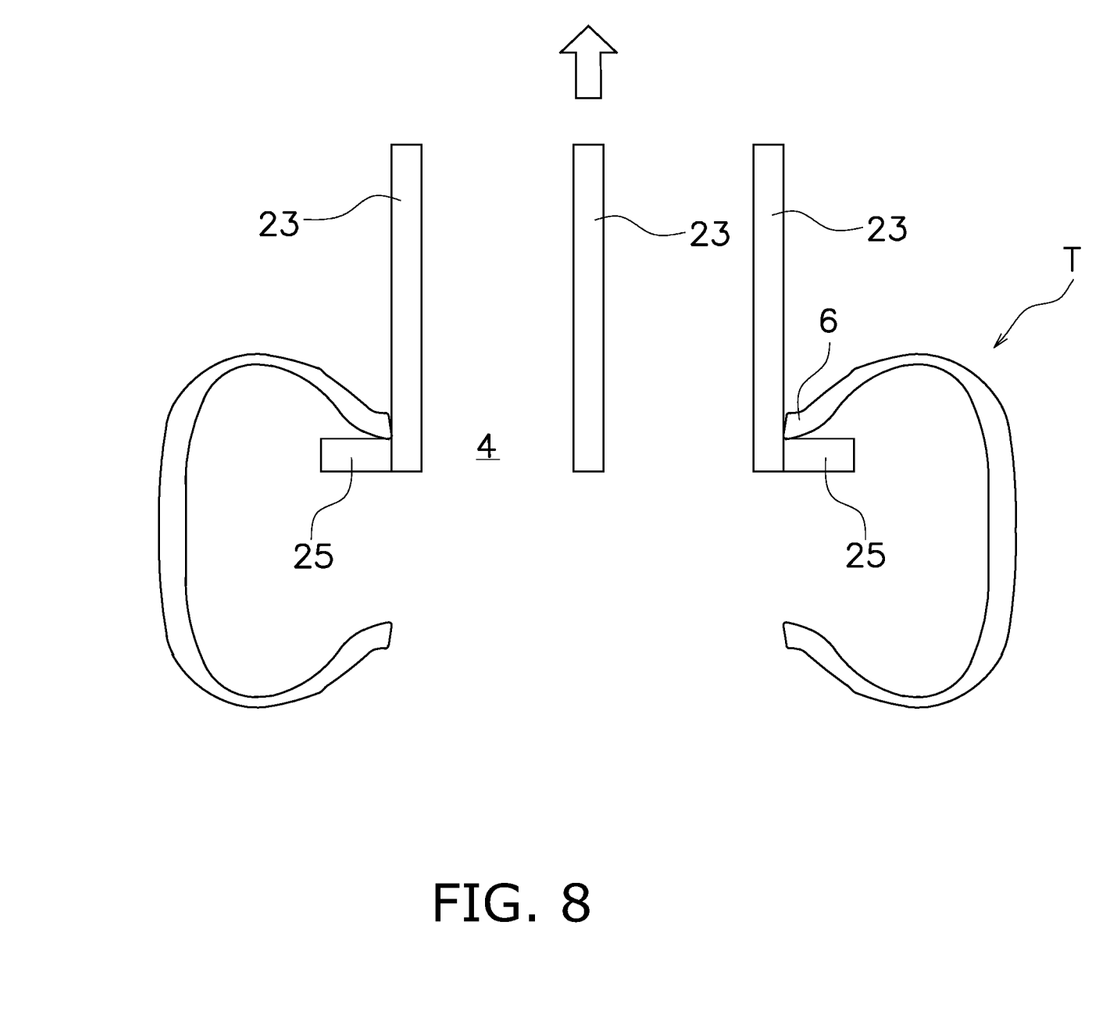
FIG. 8 is a schematic diagram illustrating one state of the tire lifting operation.

Lastly, as illustrated in FIG. 8, the arms 23 are raised, and the hooks 25 support the upper opening edge 6 of the center hole 4 of the tire T from below to lift the same.

(4) Control Structure of Tire Transport Apparatus

FIG. 9 is a block diagram illustrating the control structure of the tire transport apparatus. With reference to FIG. 9, a control structure of the tire transport apparatus 1 is described.

The tire transport apparatus 1 includes a controller 51.

The controller 51 is a computer system including a processor (such as a CPU), a storage device (such as a ROM, a RAM, an HDD, or an SSD), and various interfaces (such as an A/D converter, a D/A converter, and a communication interface). The controller 51 performs various control operations by executing a program stored in a storage section (corresponding to a part or the whole of storage area of the storage device).

The controller 51 may be constituted of a single processor, or may be constituted of a plurality of independent processors for individual controls.

A part or the whole of functions of individual components of the controller 51 may be realized as a program that can be executed by the computer system constituting the controller 51. Other than that, a part of functions of individual components of the controller 51 may be constituted of a custom IC.

The controller 51 is connected to the X-axis drive device 71, the Y-axis drive device 73, the Z-axis drive device 75, and the arm extension/retraction device 77. The controller 51 can control these devices.

The controller 51 is connected to the first to third laser distance sensors 31A to 31C, and the first to third contact sensors 33A to 33C. The controller 51 receives detection signals from these sensors.

Although not illustrated, the controller 51 is connected to sensors and switches for detecting states of individual devices, and to an information input device.

(5) Details of Tire Lift Control Action

Figure 10:
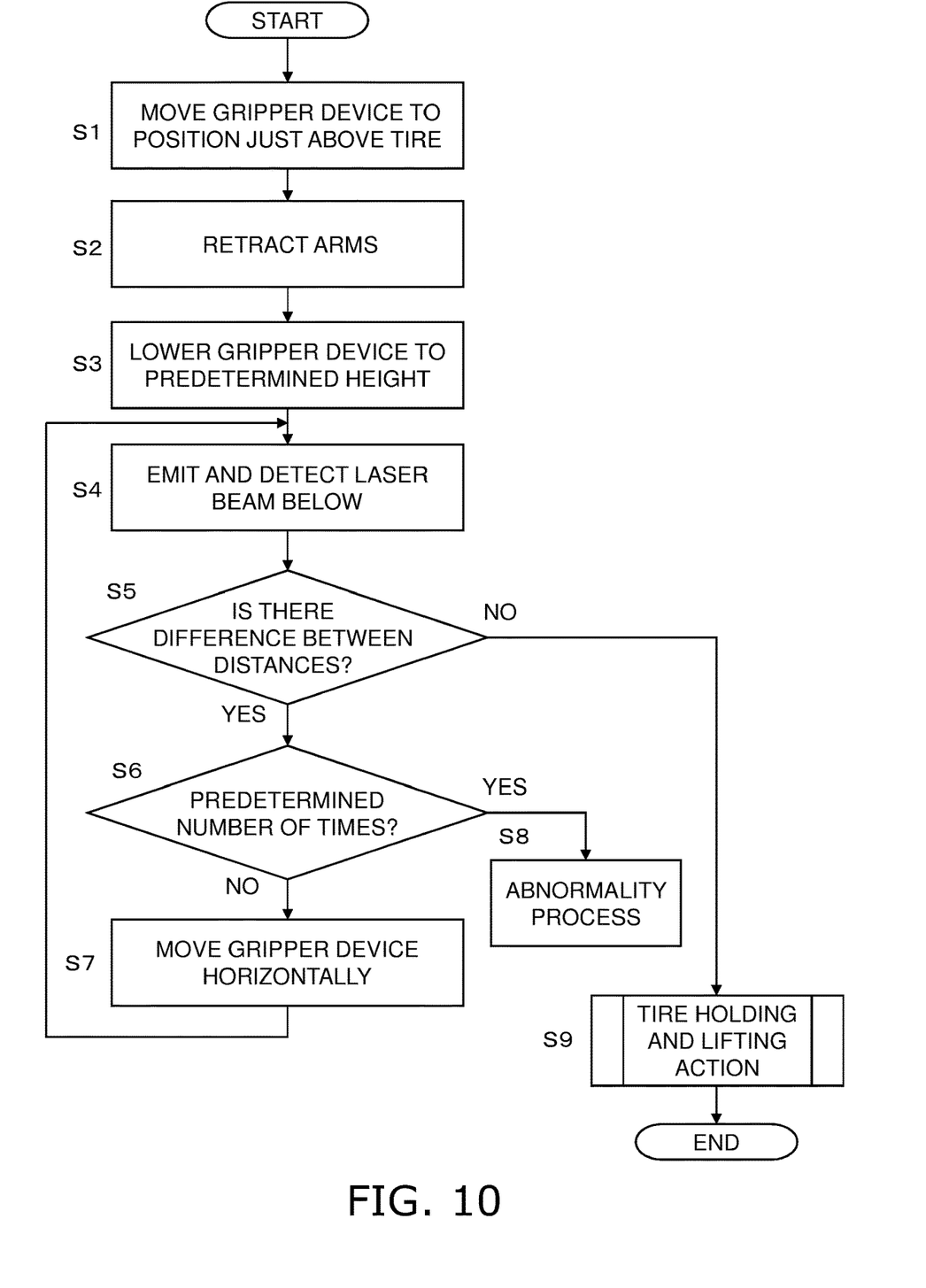
FIG. 10 is a flowchart illustrating a tire lift control operation of the tire transport apparatus.
Figure 11:
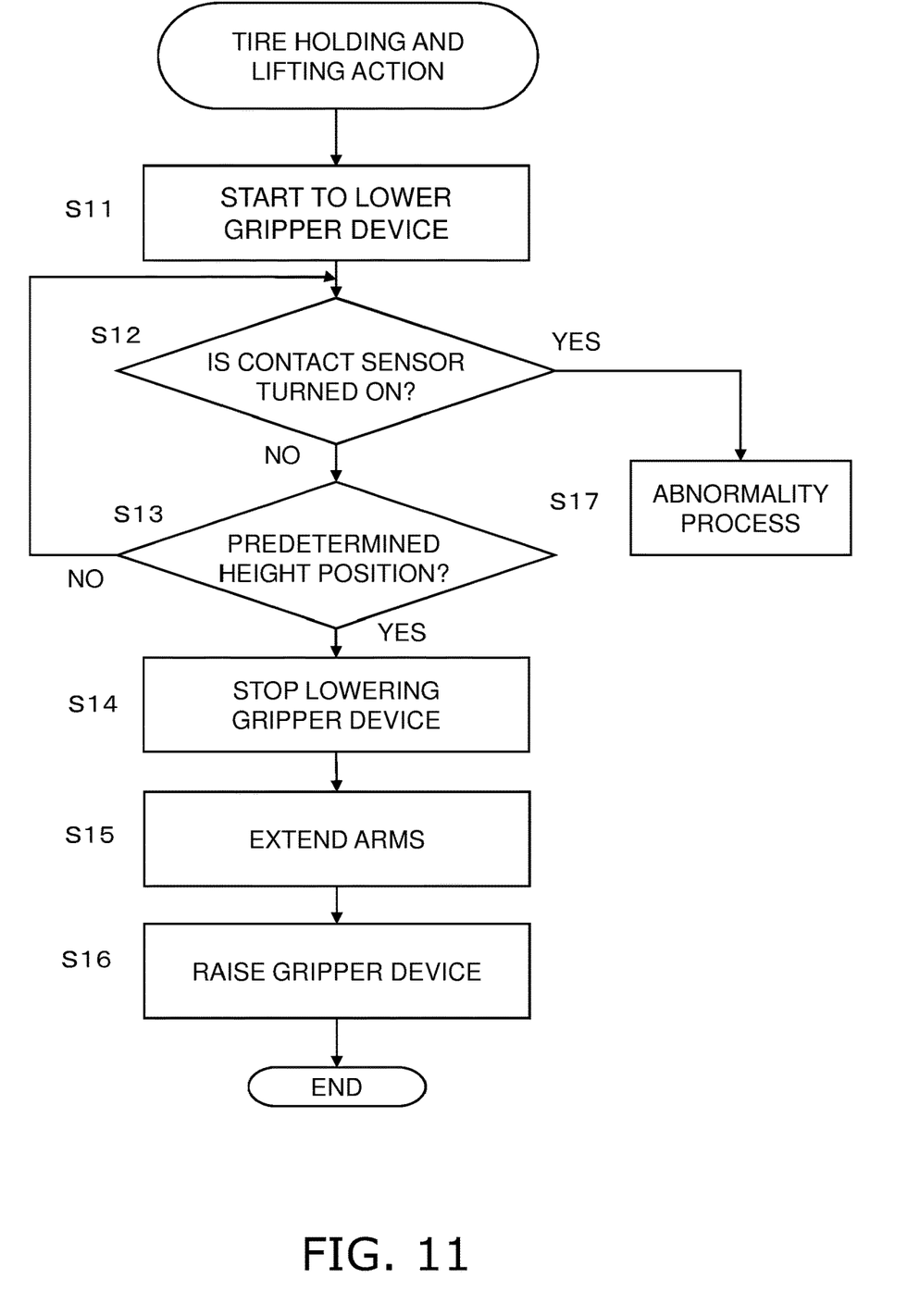
FIG. 11 is a flowchart illustrating the tire lift control operation of the tire transport apparatus.
Figure 12:
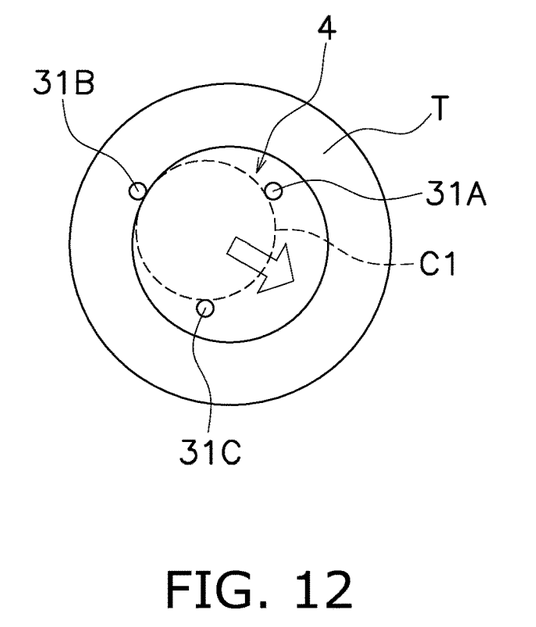
FIG. 12 is a schematic plan view illustrating one state of a positional relationship between the tire and the laser distance sensors.
Figure 13:
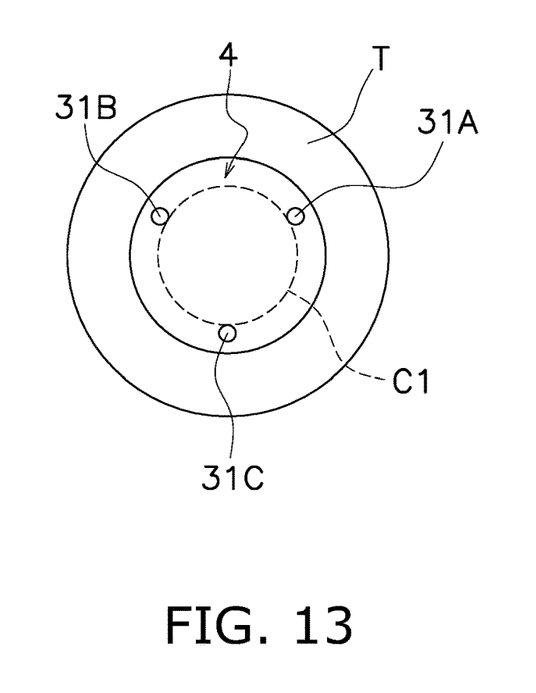
FIG. 13 is a schematic plan view illustrating one state of the positional relationship between the tire and the laser distance sensors.
Figure 14:
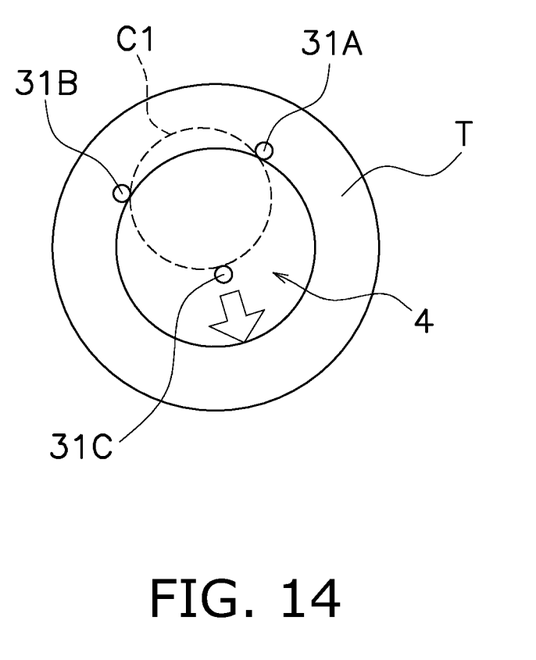
FIG. 14 is a schematic plan view illustrating one state of the positional relationship between the tire and the laser distance sensors.

With reference to FIGS. 10 to 14, details of the tire lift control operation are described. FIGS. 10 and 11 are flowcharts illustrating the tire lift control operation of the tire transport apparatus. FIGS. 12 to 14 are schematic plan views each illustrating one state of a positional relationship between the tire and the laser distance sensors.

The control flowchart described below is an example, and individual steps may be omitted or exchanged with each other as necessary. In addition, a plurality of steps may be executed simultaneously, or a part or the whole of them may be executed in an overlapping manner.

Further, each block in the control flowchart is not necessarily a single control operation but can be replaced by a plurality of control operations expressed in a plurality of blocks.

Operations of individual devices are results of commands from a control unit to the devices, which can be expressed by steps of a software application.

In Step S1, the mobile unit 7 is moved and stopped at a position just above the tire T. Specifically, the controller 51 controls the X-axis drive device 71 and the Y-axis drive device 73 to perform the operation described above. The position of the tire T is stored in advance in the storage section of the controller 51.

In Step S2, the arms 23 are moved to the innermost positions (i.e., they come to the retracted state). Specifically, the controller 51 controls the arm extension/retraction device 77 to perform the operation described above. The above operation is omitted if the arms 23 are initially in the retracted state.

In Step S3, the gripper device 9 is lowered to a predetermined height. Specifically, the controller 51 controls the Z-axis drive device 75 to perform the operation described above. The predetermined height described above is, for example, a height such that a distance in the height direction between the lower part bottom surface of the arm 23 and the topmost surface of the tire T becomes a predetermined value (such as 300 mm). The height of the topmost surface of the tire T is stored in advance in the storage section of the controller 51.

In Step S4, the first to third laser distance sensors 31A to 31C each emit the laser beam downward and receive the reflected laser beam to detect a distance to an object below. At this time, the gripper device 9 is lowered as described above so that the first to third laser distance sensors 31A to 31C are close to the tire T, and hence detection accuracy is improved.

In Step S5, it is determined whether or not there is a difference between distances between the first to third laser distance sensors 31A to 31C and an object below. If Yes, the process proceeds to Step S6. If No, the process proceeds to Step S9.

"Yes" in Step S5 means, for example, an example as illustrated in FIG. 12, where two of the first to third laser distance sensors 31A to 31C are located just above the center hole 4 of the tire T, but one of them is located just above the tire T and has a measured distance shorter than those of other two. This is when the arms 23 are in an inappropriate position, and one of the hooks 25 will abut the tire T when the arms 23 are lowered.

"No" in Step S5 is illustrated in FIG. 13, where all the first to third laser distance sensors 31A to 31C are located just above the center hole 4 of the tire T.

In Step S6, it is determined whether or not the above determination has been made more than a predetermined number of times. If Yes, the process proceeds to Step S8. If No, the process proceeds to S7.

In Step S7, the gripper device 9 is moved in the horizontal direction. The movement distance is 5 to 10 mm, for example. Specifically, as illustrated by a white arrow in FIG. 12, the controller 51 moves the gripper device 9, i.e., the arms 23 so that one of the first to third laser distance sensors 31A to 31C that detected a short distance comes to inside the center hole 4 of the tire T in a plan view (e.g., in the direction toward the center of the circle), and then monitors the distances measured by the first to third laser distance sensors 31A to 31C. Therefore, the position of the arms 23 is corrected. As a result, the arms 23 hardly contact the tire T. When Step S7 is finished, the process returns to Step S4.

If two of the first to third laser distance sensors 31A to 31C are located just above the tire T and have measured distances shorter than that of the other one as illustrated in FIG. 14, the controller 51 moves the gripper device 9, i.e., the arms 23 so that two of the first to third laser distance sensors 31A to 31C that detected short distances come to inside the center hole 4 of the tire T in a plan view, as illustrated by a white arrow in FIG. 14.

In Step S8, an abnormality process is performed. Specifically, an abnormality alarm is generated. After that, an operator performs a process to resolve the abnormal state by manual operation, manual work, or the like.

In Step S9, a tire holding and lifting operation is performed (as described later).

As described above, the controller 51 monitors the distances measured by the first to third laser distance sensors 31A to 31C, and if the tire T is not detected, it controls the Z-axis drive device 75 to lower the arms 23 to hold the tire T.

On the other hand, if there is a difference between the distances measured by the first to third laser distance sensors 31A to 31C (i.e., if any of the first to third laser distance sensors 31A to 31C detects the tire T), the controller 51 does not allow the Z-axis drive device 75 to lower the arms 23. This means that if at least one of the first to third laser distance sensors 31A to 31C detects the tire T, the measured distance of the sensor becomes shortest, and the tire exists just below the sensor. In other words, the tire T is located in a position overlapping with the hook 25 in a plan view (e.g., the tire T is tilted or in an inappropriate position). In other words, the controller 51 determines that the arms 23 are in an inappropriate position.

In addition, if at least one of the first to third laser distance sensors 31A to 31C is not inside the center hole 4 of the tire T in a plan view as described above, correction of the horizontal position of the gripper device 9 and remeasurement of the distances below are repeatedly performed. In other words, if there is a difference between the measured distances (Yes in Step S5), the gripper device 9 is moved by a predetermined distance (such as a few millimeters) in Step S7, and the distances to the tire T are measured again in Step S5. A significant difference between the measured distances is, for example, more than a predetermined value such as 30 to 50 mm.

With reference to FIG. 11, Step S9 of FIG. 10 is described in detail.

In Step S11, lowering of the gripper device 9 is started from the state of FIG. 5, for example. Specifically, the controller 51 controls the Z-axis drive device 75 to perform the operation described above.

In Step S12, it is determined whether or not at least one of the first to third contact sensors 33A to 33C is turned on. Specifically, the controller 51 performs the above determination based on the detection signals from the first to third contact sensors 33A to 33C. If Yes, the process proceeds to Step S17. If No, the process proceeds to Step S13.

In Step S13, it is determined whether or not the gripper device 9 has reached a predetermined height position. Specifically, the controller 51 performs the above determination based on a detection signal from a sensor (not shown). If Yes, the process proceeds to Step S14. If No, the process returns to Step S12.

In Step S14, lowering of the gripper device 9 is stopped (e.g., the state of FIG. 6). Specifically, the controller 51 controls the Z-axis drive device 75 to perform the operation described above.

In Step S15, the three arms 23 are moved outward in the radial direction (e.g., the state of FIG. 7). Specifically, the controller 51 controls the arm extension/retraction device 77 to perform the operation described above. In this way, the hooks 25 are positioned below the upper opening edge 6 of the center hole 4 of the tire T. The movement of the three arms 23 is stopped based on the detection signal of the touch sensor or the like, when the main body of the arm 23 abuts the upper opening edge of the center hole 4 of the tire T.

In Step S16, the gripper device 9 is raised (e.g., the state of FIG. 8). Specifically, the controller 51 controls the Z-axis drive device 75 to perform the operation described above. In this way, the arms 23 are raised, and the hooks 25 of the arms 23 support the upper opening edge of the center hole 4 of the tire T from below to lift the entire tire T.

In Step S17, the abnormality process is performed. Specifically, further lowering of the arm 23 is stopped. Furthermore, the abnormality alarm is generated, and after that, the operator performs the process to resolve the abnormal state by manual operation, manual work, or the like. In this way, if at least one of the first to third contact sensors 33A to 33C has detected the tire T, the abnormality process is promptly performed without performing position correction, unlike when at least one of the first to third laser distance sensors 31A to 31C has detected the tire T. This is because it is considered in the above example that the tire T is in a state with which the adjustment such as the position correction cannot deal.

2. Second Example

In the first example, if the correction operation of Step S7 of FIG. 10 has been performed a plurality of times, but in vain, the abnormality process is performed in Step S8.

As a variation of the above operation, a second example is described. The basic structure and operation of the second example are the same as those of the first example.

Between Step S5 and Step S6 of FIG. 10, the controller 51 performs a new step, in which it is determined how many stacks of the tires T from the top can be transported, on the basis of the detection results of the first to third laser distance sensors 31A to 31C. Then, if there is any transportable tire T, the process proceeds to Step S9, in which the tire holding and lifting operation is performed. In the above tire holding and lifting operation, it may be possible to transport the transportable tires T in bulk, or to transport them one by one.

In the above example, if there is a difference between the detected distances because of tilting of upper tires T, for example, after transporting the tilted upper tires T as described above, lower tires T can also be transported next.

As results of the above, if there is a difference between the distances measured by the first to third laser distance sensors 31A to 31C, only the transportable number of tires T can be transported. Therefore, transport efficiency of the tires T can be improved.

A specific example is described below. As illustrated in FIG. 1, it is supposed that there are three stacked tires T, the tire width is 200 mm, and the total height of the three tires is 600 mm. The controller 51 has recognized that there are three stacked tires T based on inventory data.

First, as illustrated in Steps S4 and S5 of FIG. 10, at 300 mm above the tire T, the first to third laser distance sensors 31A to 31C detect the distances to the tire T.

In this example, suppose that the correction operation in Step S7 of FIG. 10 is performed once, but a difference between the distances is not canceled, and after that, in Step S5, there is again a difference between the distances (Yes in Step S5). Then, the controller 51 performs a new step, in which it is determined how many stacks of the tires T from the top can be transported, on the basis of the detection results of the first to third laser distance sensors 31A to 31C.

For instance, it is supposed that two sensors among the first to third laser distance sensors 31A to 31C have a detection result of 900 mm (the tire T is not detected), while one sensor has a detection result of 700 mm (the lowest tire T is detected). In this example, the controller 51 determines that two stacked tires T from the top can be transported, for example. This is, for example, when the lowest tire T is in an appropriate position, but upper tires T are tilted so that there is a difference between the detected distances as described above.

Then, next in Step S9 of FIG. 10, the upper two stacked tires T are transported.

Next, the mobile unit 7 returns to the position above the lowest tire T.

Lastly, the tire transport apparatus 1 detects the lowest tire T, and transports the same.

3. Feature of Example

The above example can also be described as follows.

The tire transport apparatus 1 (an example of the tire transport apparatus), which is an apparatus that lifts and transports a tire, includes the at least three arms 23, the arm extension/retraction device 77, the Z-axis drive device 75, and the controller 51.

The three arms 23 (an example of the arms) each include the arm main body 24 (an example of the arm main body), and the hook 25 (an example of the protrusion) disposed to protrude outward at the lower part of the arm main body 24 for lifting the tire.

The arm extension/retraction device 77 (an example of the arm extension/retraction mechanism) moves the arms 23 in the horizontal extension/retraction direction.

The Z-axis drive device 75 (an example of the lift mechanism) raises and lowers the arms 23.

The first to third laser distance sensors 31A to 31C are disposed on the outer side of the first circle C1 (an example of the circle) including the distal ends of the hooks 25 when the arms 23 are above the tire T and in the retracted state to detect an object below.

If at least one of the first to third laser distance sensors 31A to 31C detects the tire T, the controller 51 determines that the arms 23 are in an inappropriate position.

In this apparatus, if one of the first to third laser distance sensors 31A to 31C detects the tire T, it means that the tire T is located at a position overlapping the hook 25 in a plan view. For example, the Z-axis drive device does not lower the arms 23. Therefore, the hooks 25 does not contact the tire T if the tire T is tilted or in an inappropriate position.

4. Other Examples

Although a plurality of examples are described above, our apparatuses are not limited to the above examples, and can be variously modified within the scope of this disclosure without deviating from the spirit thereof. In particular, the plurality of examples and variations described in this specification can be arbitrarily combined as necessary.

(1) Variations of Arms

The number of the arms may be four or more. For instance, it may be four or five.

(2) Variations of Horizontal Movement Action of Arms

In the first example, to adjust the position of the arms, the arms are moved by a predetermined distance (a few millimeters), and the laser distance sensors detect an object blow again. However, as a variation, it may be possible to continuously move the arms while measuring distances to an object below. In this example, the arms are moved until the tire T becomes not detected.

The arm position adjustment may be omitted.

(3) Variation of Laser Distance Sensor

There may be three or more laser distance sensors. For instance, there may be four, five, or six laser distance sensors. It is preferred that one laser distance sensor is disposed between the arms.

It may be possible to use, instead of the laser distance sensor, a reflection type photoelectric sensor that detects presence or absence of a reflecting object. In this example, presence or absence of the tire T just below the sensor can be detected, and the controller can discriminate between presence and absence of the tire T.

It may be not necessary to lower the gripper device prior to the detection by the laser distance sensors. In addition, it may be possible to perform the detection by the laser distance sensors while lowering the gripper device.

(4) Variation of Contact Sensor

The type and structure of the contact sensor, and the number of the contact sensors are not limited as long as they can detect contact between the bottom surface of the hook and an object below. For instance, the contact sensor may include a contacting member that moves vertically, a linear motion guide that guides the contacting member in the vertical direction, a spring that biases the contacting member downward, and a load cell that is compressed between the contacting member and another member of the hook when the contacting member contacts an object below and moves upward.

The contact sensor may be omitted.

(5) Variation of Entire Tire Transport Apparatus

The tire transport apparatus may be mounted to an overhead transport vehicle that travels in a predetermined height position, without limiting to the gantry crane.

INDUSTRIAL APPLICABILITY

Apparatuses lift a tire by inserting a plurality of arms from above inside an upper opening edge of the center hole of a tire in a lying position so that hooks of the arms support the upper opening edge from below.

The invention claimed is:

1. A tire transport apparatus comprising:
   at least three arms each having an arm main body and a protrusion disposed to protrude outward at a lower part of the arm main body to lift the tire;
   an arm extension or retraction mechanism configured to move the at least three arms in a horizontal extension or retraction direction;
   a lift mechanism configured to raise and lower the at least three arms;
   at least three optical reflection sensors disposed on an outer side of a virtual circle including distal ends of the protrusions when the at least three arms are above the tire and in a retracted state to detect an object below; and
   a controller configured to determine that one or more arms among the at least three arms are in an inappropriate position, when one or more optical reflection sensors among the at least three optical reflection sensors detect the tire.

2. The tire transport apparatus according to claim 1, wherein, when none of the at least three optical reflection sensors detects the tire, the controller performs the operation to lift the tire.

3. The tire transport apparatus according to claim 1, wherein, when one or more optical reflection sensors among the at least three optical reflection sensors detect the tire, the controller moves the at least three arms in a direction from the optical reflection sensor that has detected the tire toward the center of a circle connecting the three optical reflection sensors.

4. The tire transport apparatus according to claim 1, wherein
   the optical reflection sensor is a laser distance sensor, and
   the controller monitors distances measured by the laser distance sensors, and determines that the optical reflection sensor has detected the tire when there is a difference between distances measured by the laser distance sensors.

5. The tire transport apparatus according to claim 4, wherein the controller moves the at least three arms in the direction from the laser distance sensor that has detected a short distance toward the center of a circle connecting the three laser distance sensors, and then monitors the distances measured by the laser distance sensors.

6. The tire transport apparatus according to claim 1, further comprising a contact sensor disposed at a bottom surface of the protrusion to detect contact between a distal end side of the protrusion and an object below, wherein
   if the contact sensor detects the tire during lowering of the arm, the controller controls the lift mechanism to stop further lowering of the at least three arms.

7. The tire transport apparatus according to claim 4, wherein the controller determines a number of tires that is configured to be transported based on a difference between the distances measured by the laser distance sensors.

* * * * *